US011715196B2

(12) United States Patent
Ewald et al.

(10) Patent No.: US 11,715,196 B2
(45) Date of Patent: Aug. 1, 2023

(54) METHOD AND SYSTEM FOR DYNAMIC MULTI-DIMENSIONAL IMAGES OF AN OBJECT

(71) Applicant: KONINKLIJKE PHILIPS N.V., Eindhoven (NL)

(72) Inventors: Arne Ewald, Hamburg (DE); Frank Michael Weber, Hamburg (DE); Rolf Jurgen Weese, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 395 days.

(21) Appl. No.: 16/631,869

(22) PCT Filed: Jul. 18, 2018

(86) PCT No.: PCT/EP2018/069451
§ 371 (c)(1),
(2) Date: Jan. 17, 2020

(87) PCT Pub. No.: WO2019/016244
PCT Pub. Date: Jan. 24, 2019

(65) Prior Publication Data
US 2020/0160513 A1 May 21, 2020

(30) Foreign Application Priority Data

Jul. 18, 2017 (EP) .................................... 17181881

(51) Int. Cl.
*G06K 9/00* (2022.01)
*G06T 7/00* (2017.01)
(Continued)

(52) U.S. Cl.
CPC .............. *G06T 7/0012* (2013.01); *G06T 7/11* (2017.01); *G06T 7/149* (2017.01); *G06T 7/251* (2017.01);
(Continued)

(58) Field of Classification Search
None
See application file for complete search history.

(56) References Cited

U.S. PATENT DOCUMENTS 9,375,184 B2 * 6/2016 Boettger .............. A61B 5/7275
9,406,142 B2 * 8/2016 Gorman, III ............ G06T 7/174
(Continued)

FOREIGN PATENT DOCUMENTS

WO WO-2015139937 A1 * 9/2015 ........... A61B 8/4494
WO 2016059498 A1 4/2016
(Continued)

OTHER PUBLICATIONS

Pouch et al., "Development of semi-automated method for mitral valve modeling with medial axis representation using 3D ultrasound" (Year: 2015).*
(Continued)

*Primary Examiner* — Soo Jin Park (57) ABSTRACT

The present invention relates to an image processing apparatus for deriving multi-dimensional images of an object and an according system and method. The image processing apparatus comprises an interface configured to provide 3D image data of an object and to provide a sequence of images of the object. The image processing apparatus further comprises a processing unit configured to obtain a personalized 3D model of the object by applying a model-based segmentation to the 3D image data of the object and to adapt the personalized 3D model based on at least a part of the images of the sequence of images of the object.

20 Claims, 5 Drawing Sheets

(51) Int. Cl.
  *G06T 7/11* (2017.01)
  *G06T 7/149* (2017.01)
  *G06T 7/246* (2017.01)
(52) U.S. Cl.
  CPC .............. *G06T 2200/04* (2013.01); *G06T 2207/10076* (2013.01); *G06T 2207/10081* (2013.01); *G06T 2207/10136* (2013.01); *G06T 2207/30048* (2013.01)

(56) References Cited

U.S. PATENT DOCUMENTS

| | | | |
|---|---|---|---|
| 9,953,429 B2* | 4/2018 | Mollus | G16H 30/40 |
| 10,321,892 B2* | 6/2019 | Wang | G06T 7/251 |
| 2006/0291724 A1 | 12/2006 | Fujiwara | |
| 2008/0137924 A1 | 6/2008 | Boese et al. | |
| 2012/0253170 A1 | 10/2012 | Kim | |
| 2013/0023766 A1 | 1/2013 | Han et al. | |
| 2015/0016704 A1 | 1/2015 | Weese et al. | |
| 2015/0051480 A1 | 2/2015 | Hwang et al. | |
| 2016/0058520 A1 | 3/2016 | Yang et al. | |
| 2016/0220311 A1 | 8/2016 | Mansi et al. | |
| 2016/0307331 A1 | 10/2016 | Mollus et al. | |
| 2017/0065242 A1* | 3/2017 | Chirvasa | A61B 6/466 |
| 2017/0084023 A1 | 3/2017 | Wachter-Stehle et al. | |

FOREIGN PATENT DOCUMENTS

| | | |
|---|---|---|
| WO | 2016110463 A1 | 7/2016 |
| WO | 2016170372 A1 | 10/2016 |
| WO | 2018077747 A1 | 5/2018 |

OTHER PUBLICATIONS

Alessandrini et al., "A pipeline for the generation of realistic 3D synthetic echocardiographic sequences: methodology and open-access database" (Year: 2015).*

Zhang, "Iterative Point Matching for Registration of Free-Form Curves and Surfaces", International Journal of Computer Vision, 13:2, 119-152 (1994) (Year: 1994).*

Ecabert et al: "Automatic Model-Based Segmentation of the Heart in CT Images"; IEEE Transactions on Medical Imaging, vol. 27, No. 9, Sep. 2008, pp. 1189-1201.

PCT/EP/2018/069451. ISR & WO, Sep. 20, 2018, 17 Page Document.

Weese et al: "Shape-Constrained Deformable Models and Applications in Medical Imaging" Technical Note PR-TN 2013/00749, Dec. 2013, 42 Page Document.

* cited by examiner

METHOD AND SYSTEM FOR DYNAMIC MULTI-DIMENSIONAL IMAGES OF AN OBJECT

CROSS-REFERENCE TO PRIOR APPLICATIONS

This application is the U.S. National Phase application under 35 U.S.C. § 371 of International Application No. PCT/EP2018/069451, filed on Jul. 18, 2018, which claims the benefit of European Patent Application No. 17181881.8, filed on Jul. 18, 2017. These applications are hereby incorporated by reference herein.

FIELD OF THE INVENTION

The present invention relates to an image processing apparatus for deriving multi-dimensional images of an object, an according system and method.

BACKGROUND OF THE INVENTION

For many medical imaging approaches such as image guided interventions an accurate and at the same time dynamic three-dimensional segmentation of a specific organ is desirable. Such segmentation of the organ could, for example, enable clinicians to precisely track devices in minimally-invasive interventional heart procedures. A detailed three-dimensional (3D) image usually offers low temporal resolution such that the fast dynamics of on organ, e.g. the heart, cannot be captured. On the other hand, two-dimensional (2D) techniques might lack spatial information for proper imaging and segmentation of an entire organ.

An imaging apparatus for imaging an object is described in document US 2015/016704 A1. A geometric relation between first and second images of the object is provided, using marker locations in the first and second images.

SUMMARY OF THE INVENTION

There may thus be a need to provide a combination of 2D and 3D imaging techniques for accurate dynamic segmentation of an object or organ, e.g. the heart of a patient, so that detailed 3D information and precise dynamic information of the organ is provided.

The object of the present invention is solved by the subject-matter of the independent claims; further embodiments are incorporated in the dependent claims. It should be noted that the following described aspects of the invention apply also for the image processing apparatus, the system and the method for deriving dynamic multi-dimensional images of an object.

According to the present invention, an image processing apparatus for deriving multi-dimensional images of an object is provided. The image processing apparatus comprises an interface configured to provide 3D image data of an object and to provide a sequence of images of the object. The image processing apparatus comprises a processing unit configured to obtain a personalized 3D model of the object by applying a model-based segmentation to the 3D image data of the object and to adapt the personalized 3D model based on at least a part of the images of the sequence of images of the object, wherein the personalized 3D model is a deformable model.

In an example, the image processing apparatus comprises an interface configured to provide 3D image data of an object. Any precise scan, e.g. a 3D scan acquired by computed tomography (CT), 3D ultrasound (US) or magnetic resonance (MR) or similar scan can be used as 3D image data of the object. The 3D scan provides complete information of the object. The interface is also configured to provide a sequence of images of the object.

The derived multi-dimensional images are defined as adapted 3D model of the object or a dynamic 3D shape of the object. In other words, a 3D model changing over time is provided.

The sequence of images of the object is defined as a sequence comprising only one 2D image per time unit, a set of 2D images or a thin slab of image data. The thin slab of image data means image data of a part of the organ, for example, wherein the size of the selected part is such as to achieve a desired frame rate for imaging.

The sequence of images of the object is provided as a dynamic sequence. The image or images of the sequence can contain, in some examples, only a sub-region of the object. This ensures that a high framerate can be provided. The 2D image(s) can be provided as cross-plane image(s). A cross-plane image is an image comprising two planes arranged in an angle to each other, e.g. 90 degrees. Also, multi-plane image(s), such as tri-plane image(s) can be provided. The slab of image data of the image(s) of the object provides image data including 2D and 3D information of the object. The images, e.g. ultrasound images, are provided with a high framerate for tracking the object over time. Also, other types of images suitable for tracking at a high framerate can be used.

The image processing apparatus comprises a processing unit configured to obtain a personalized 3D model of the object by applying model-based segmentation to the 3D image data of the object. The processing unit is configured to adapt the personalized 3D model based on at least a part of the images of the sequence of images of the object. In image guided interventions, the detailed 3D image can for example be a CT scan already acquired for device planning or 3D ultrasound or MR scans. The personalized 3D model is a result of the model-based segmentation of the 3D image data. The personalized 3D model is a detailed and accurate 3D model of the object. Given this 3D model, one can use the images of the object generated with a high framerate in order to track the object over time.

In an example, the processing apparatus further comprises a display unit. The display unit is configured to display an overlay of the adapted personalized 3D model and the sequence of images of the object. The overlay is displayed based on the adapted personalized 3D model, which is provided for example as a mesh representing the individual anatomy of the object. Based on the sequence of images of the object and the mesh the overlay can be constructed. The display unit is configured to receive the adapted personalized 3D model of the object and the dynamic sequence of images of the object. Thus, dynamic multi-dimensional images of the object are displayed. The display unit is provided as a part of the processing apparatus or as an external device.

By overlaying the adapted 3D model and the images of the object the shape of the object and its dynamic changes over time are made visible. As will become more apparent in the following, in those regions of the object which are provided by the sequence of images, the personalized 3D model is adapted to the image. In the regions of the object not shown in the images, the shape of the object is estimated by combining the static information about these regions from the personalized 3D model with the dynamic information of other object parts that are shown in the images of the sequence.

According to the present invention, also a system for deriving dynamic multi-dimensional images of an object is provided. The system comprises an image acquisition apparatus configured to acquire 3D image data of the object and to generate a plurality of images of the object. The system comprises an image processing apparatus configured to obtain a personalized 3D model of the object, and to adapt the 3D model based on at least a part of the images of the sequence of images of the object, wherein the personalized 3D model is a deformable model.

In an example, the system for deriving dynamic multi-dimensional images of an object comprises an image acquisition apparatus and an image processing apparatus. The 3D image data is acquired as a 3D scan, e.g. computed tomography (CT), 3D ultrasound (US) or magnetic resonance (MR) or similar scan. The dynamic multi-dimensional images are derived by configuring the image processing apparatus to obtain a personalized 3D model of the object and to adapt the 3D model based on at least a part of the images of the sequence of images. Such system provides precise live tracking. The system can guide the user through the whole process of first acquiring the 3D image, segmenting it and, then, perform the fast dynamic image acquisition and segmentation.

Often detailed 3D images provide low temporal resolution such that the fast dynamics of e.g. the heart cannot be captured. On the other hand, fast 2D techniques lack the spatial information to image and segment an entire organ as required. The multi-dimensional images provide both: high spatial information and temporal resolution.

In an example, the image acquisition apparatus comprises a first image acquisition unit. The first image acquisition unit is configured to acquire a 3D image of the object, e.g. as 3D scan from CT, US or MR. The image acquisition apparatus further comprises a second image acquisition unit configured to generate a sequence of images of the object. The second image acquisition apparatus can be an ultrasound system comprising an ultrasound probe for example.

In some examples, a matrix probe can be used as first image acquisition unit, such as a TTE matrix probe that is often used for cardiac imaging, wherein TTE means transthoracic echo, an ultrasound probe outside the body imaging the heart through the thorax. X5-1 (TTE) or Another probe example is a TEE matrix probe often used during interventions, wherein TEE means trans-esophageal echo, i.e. the probe is inserted into esophagus. In some examples, the second image acquisition unit is a conventional 2D probe or a TEE probe.

In an example, the image acquisition unit is an ultrasound transducer. The Philips ultrasound transducer is configured to acquire a 3D image of the object and also to generate a plurality of 2DX images of the object and enables thus a stand-alone system.

According to the present invention, also a method for deriving dynamic multi-dimensional images of an object is provided, the method comprising the steps of:
a) providing 3D image data of an object;
b) obtaining a personalized 3D model of the object by applying a model-based segmentation to the 3D image data of the object;
c) providing a sequence of images of the object;
d) adapting the personalized 3D model based on at least a part of the images of the sequence of images of the object, wherein the personalized 3D model is a deformable model.

According to an example, a method for deriving dynamic multi-dimensional images of an object is provided. Firstly, 3D image data of an object is provided. A model-based segmentation is applied to the 3D image data of the object. The 3D image is segmented for obtaining a 3D model of the object. Thus, a personalized model of the object is obtained. Pre-interventional detailed 3D image data can be provided from a slow but precise scan, e.g. a 3D scan acquired by computed tomography (CT), 3D ultrasound (US) or magnetic resonance (MR) or similar scan. The 3D image data provides individual and detailed 3D information of the object.

A sequence of images of the object is provided. The sequence of images of the object are as described above. The sequence of images, is generated in a period of time. The images provide changes or movements of the object. In some examples, the images are generated subsequently with the same framerate. In other examples, the sequence of images is generated with different frame rates.

In a further step, the 3D model of the object is continuously adapted based on at least a part of the images of the sequence of images of the object, i.e. to the structures of the object provided by the image(s). Thus, segmentation of the generated image(s) of the object is carried out based on the personalized 3D shape of the object. This way, clinicians can reliably track moving organs with a level of detail and temporal dynamics that is not achieved in current applications.

Fast and reliable multi-dimensional (3D+time) individual images of the object, e.g. an organ such as the heart, is derived providing a level of detail corresponding to that of the 3D image scan and the temporal dynamics as gained from fast 2D imaging acquisition. However, for the object parts not captured by the sequence of images, the level of detail is less than that of the 3D image. In other words, the adapted 3D model changing over time or an adapted 3D model providing temporal resolution of the object is provided. Thus, fast and reliable multi-dimensional images are provided. This provides enhanced navigation during catheter-based interventions, for example.

In an example, during adapting the personalized 3D model spatial information is provided by the personalized 3D model of the object. In other words, spatial information that is missing on the images of the sequence of images is provided by the personalized 3D model of the object. This can be achieved by replacing the generic mean shape or mesh usually used in model-based segmentation by the 3D model of the object, which provides a personalized shape of the object.

In an example, the personalized 3D model is adapted to the images of the sequence of images by replicating and/or stacking the images. In order to use a 2D image for segmentation, the single image is stacked (repeated) to create a 3D volume with identical information in one direction. This enables the use of 3D segmentation algorithms and models on 2D image data. In other words, the adaptation of the personalized 3D model is performed by adapting it to a sufficient number of images covering the object. In an example, a set of different images (e.g. 2D image planes or a set of 3D images that each cover a part of the object) provide enough information to adapt the personalized 3D model. In other words, it is sufficient, to provide different images, each covering a region of the object, to adapt the 3D model. The result is a dynamic 3D shape of the object.

In some examples, the stacking of images happens when a 3D model is adapted to 2D images. When the personalized the 3D model is obtained by adapting a generic 3D model to multiple 2D images, stacking of images can be performed. Each of the 2D images would be stacked (repeated) to create a pseudo-3D volume. Also, when the personalized 3D model is adapted to a time-series of 2D images, i.e. the images of the sequence of images, for each of the 2D images, i.e. image frames, the 2D image is stacked (repeated) to create a pseudo-3D volume.

In an example, the personalized 3D model is adapted to the images of the sequence of images of the object by use of landmarks provided for registration of the individual object geometry with the 3D model of the object. For initializing the personalized 3D model in the first acquired frame the view of the image(s) is assumed to be known, e.g. a standard view in cardiac imaging for ultrasound such as 2-chamber, 4-chamber or long axis or short axis. Landmarks corresponding to these standard views have initially been encoded in the generic mean shape used for 3D segmentation. After the initial 3D segmentation, these landmarks correspond to the individual organ geometry and can be used to register the images and the personalized 3D model. Also, markers can be used for the registration of the individual object geometry with the personalized 3D model of the object.

In an example, the deformable personalized 3D model is provided as mesh triangles and is adapted to minimize a model energy comprising an internal and external energy. During adaptation of the personalized 3D model, which will be continuously repeated over time, the 3D model is adapted to the structures in the currently received image. The final deformation is achieved by minimizing the sum of the internal energy ($E_{int}$) and external energy ($E_{ext}$): $E=\alpha\, E_{int}+(1-\alpha)\, E_{ext}$, with $\alpha$ being a parameter to balance the influence of each energy. The internal energy is based upon the prior 3D segmentation and ensures shape stability whereas the external energy is driven by image forces and attracts the mesh to the organ boundaries.

In an example, the external energy is derived from target points close to the image planes of the image(s) of the object. Each mesh triangle in the proximal vicinity of the image planes looks for a target point along its normal. The target points are characteristic image features (e.g. typical grey values, edges) provided during segmentation of the 3D image for obtaining the 3D model, and depend on the particular imaging modality. Target points found by the triangles close to the image planes comprise the so called external energy. Triangles distant to the image planes do not search for target points and, hence, do not contribute to the external energy. Hence, the external energy is driven by the image from the sequence of images.

The characteristic image features are usually provided as follows: every triangle learns a specific image feature based on a set of training images. Such procedure is inherent to the model based segmentation and applied herein. First, during the adaptation of a generic 3D model to the 3D image data of the object in order to obtain the personalized 3D model. Second, during the adaptation of the personalized 3D model to the 2DX image data.

In an example, the internal energy comprises penalization of deviations between a current state of the mesh and the mesh from the personalized 3D model. In contrast to the external energy, the internal energy does not consider the image at all. The internal energy is responsible for (i) penalizing deviations between the current state of the mesh and the mesh from the personalized 3D model and (ii) for ensuring shape consistency.

In an example, the images of the object are acquired at a rate of more than 10 Hz. In other words, a framerate of more than 10 frames per second. Thus, the anatomy is tracked over time and fast dynamics of the object are captured, e.g. fast changing dynamics of the heart.

The present invention thus proposes to combine detailed 3D imaging with fast 2D imaging. Using a model-based segmentation, a personalized 3D model is obtained from segmenting the 3D scan. This can be achieved by replacing a generic mean shape of the object by a personalized shape, the 3D model of the object derived from the previous 3D scan. During segmentation of the images from the sequence of images of the object, where information might be available only in sparse planes, the missing spatial information would then be mainly driven by the personalized 3D model, i.e. the information learnt beforehand. This way, a fast and reliable 4D (3D+time) individual image of an organ such as the heart is provided in order to enhance navigation during catheter-based interventions, for example.

In contrast to other segmentation techniques, the present invention provides a full 3D segmentation. Thus, clinicians can reliably track moving organs with a level of detail and temporal dynamics that is not achieved in known applications.

These and other aspects of the present invention will become apparent from and be elucidated with reference to the embodiments described hereinafter.

It will be appreciated by those skilled in the art that two or more of the above-mentioned options, implementations, and/or aspects of the invention may be combined in any way deemed useful.

BRIEF DESCRIPTION OF THE DRAWINGS

Exemplary embodiments of the invention will be described in the following with reference to the following drawings.

DETAILED DESCRIPTION OF EMBODIMENTS

Certain embodiments will now be described in greater details with reference to the accompanying drawings. In the following description, like drawing reference numerals are used for like elements, even in different drawings. The matters defined in the description, such as detailed construction and elements, are provided to assist in a comprehensive understanding of the exemplary embodiments. Also, well-known functions or constructions are not described in detail since they would obscure the embodiments with unnecessary detail. Moreover, expressions such as "at least one of", when preceding a list of elements, modify the entire list of elements and do not modify the individual elements of the list.

Figure 1:
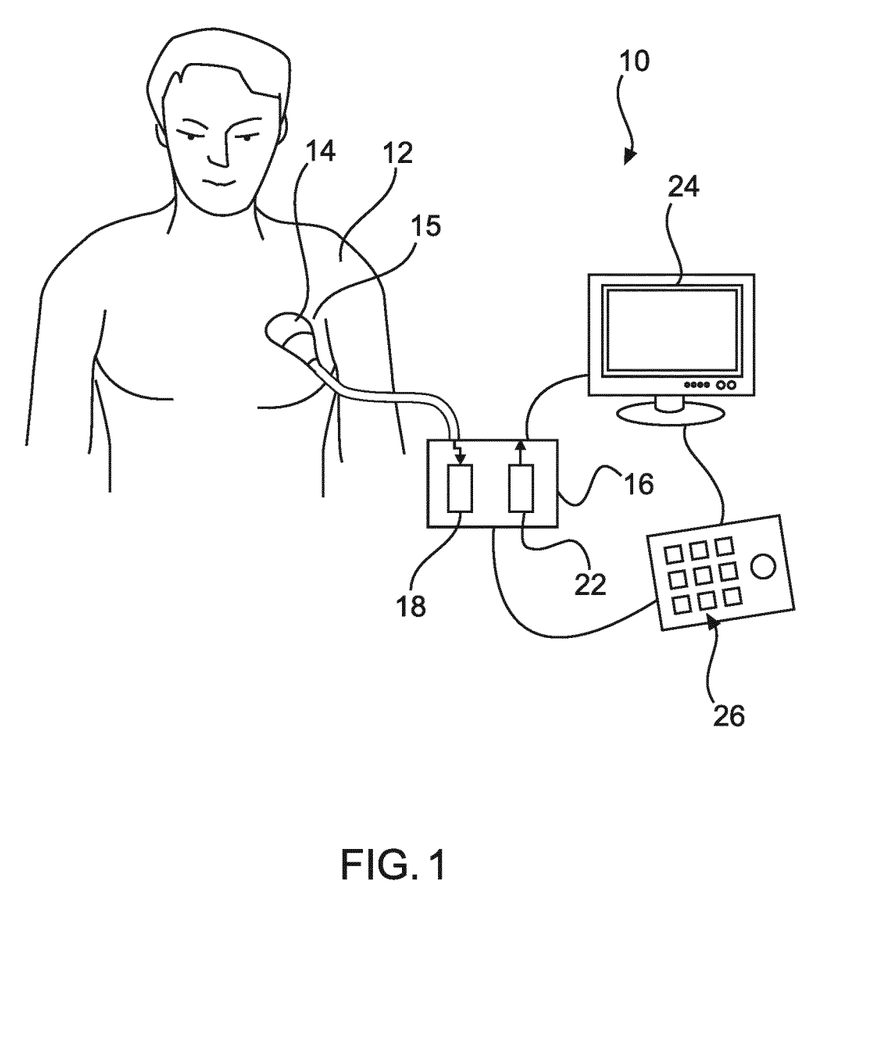
FIG. 1: a system according to the invention.

FIG. 1 shows a system 10 for deriving dynamic multi-dimensional images of an object. The system 10 comprises an image acquisition apparatus 14 and an image processing apparatus 16. The image acquisition apparatus 10 is configured to acquire 3D image data of an object 15, in this embodiment the heart of a patient 12.

In this embodiment, the 3D image data is provided as 3D ultrasound scan. In other embodiments, the 3D image data is provided as a 3D scan acquired by computed tomography (CT) or magnetic resonance (MR). The 3D scan provides complete information of the object 15. The image acquisition apparatus 14 is also configured to generate a plurality of images of the object 15 as a sequence of images of the object. In this embodiment, the images are ultrasound images provided with a framerate of 10 Hz. However, a higher framerate up to 50 Hz or more is used in other embodiments. Also, in other embodiments other types of images which are suitable for tracking at such high framerate are used.

The image processing apparatus 16 comprises an interface 18 and a processing unit 22. The interface 18 is configured to provide the 3D image data of the object 15 and the sequence of images. The processing unit 22 is configured to obtain a personalized 3D model of the object from the provided 3D image data. The 3D model is adapted based on at least a part of the image(s) of the sequence of images generated by the image acquisition apparatus 14.

In this embodiment, the image processing apparatus 16 also comprises an external display unit 24 for displaying an overlay of the adapted personalized 3D model and the sequence of images. Thus, the dynamic multi-dimensional images of the object 15 are provided to a clinician to observe the fast changing dynamics of the heart 15 in this case. Optionally, the system 10 comprises an input device for rotating the multi-dimensional images of the object 15. The input device could also be used for operating the image acquisition and/or generating procedure.

In other embodiments, the image acquisition apparatus 14 can comprise a first image acquisition unit for acquisition of the 3D image data and a second image acquisition unit for generating the sequence of images of the object. Such image acquisition apparatus 14 is an ultrasound system, for example.

Figure 2A:
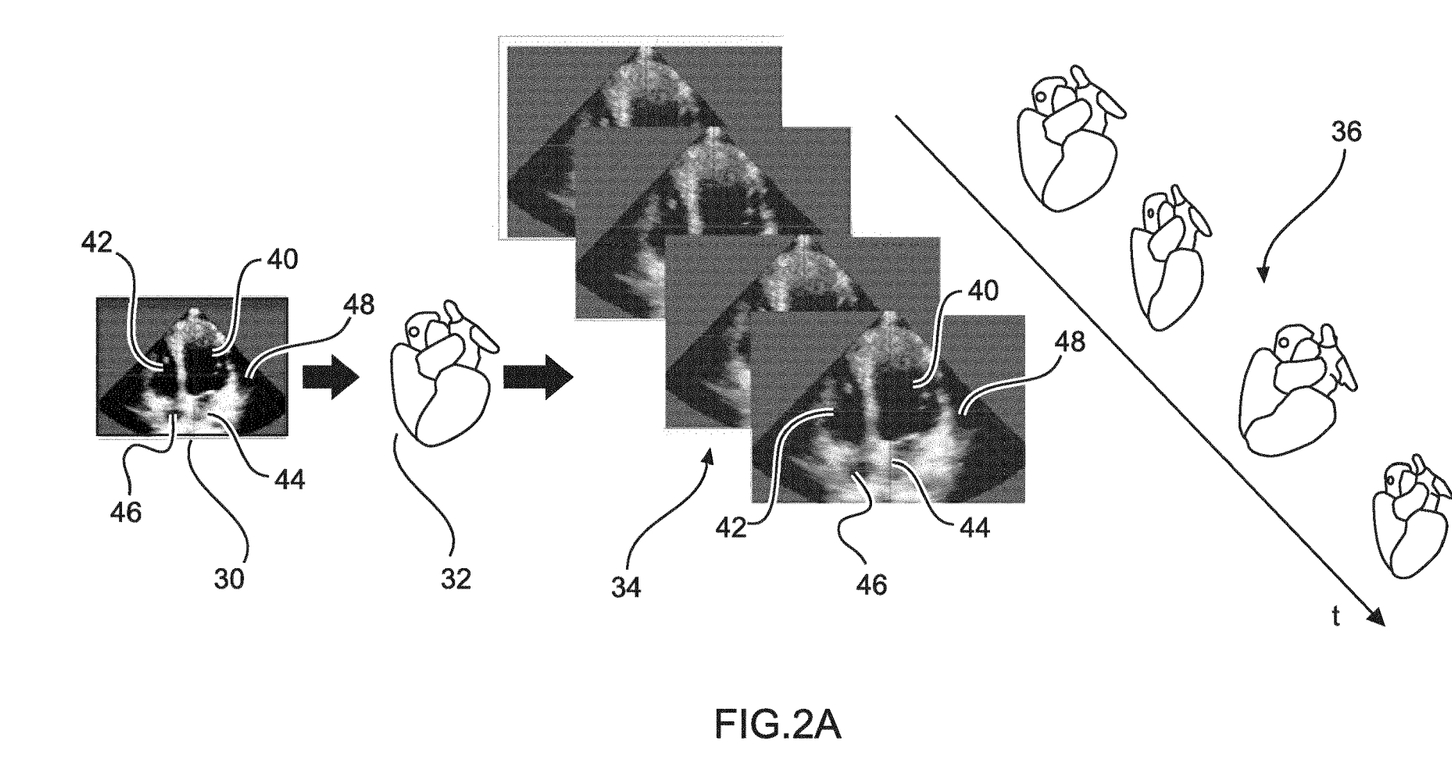
FIG. 2A: a schematic illustration according to the invention.

FIG. 2A shows a schematic illustration according to the invention. 3D image data 30 is provided as 3D ultrasound image data in this embodiment. The 3D image data 30 provides the upper heart chambers 40, 42 and the lower heart chambers 44, 46. This 3D scan is subsequently segmented using a model-based segmentation. A 3D model 32 of the object 15, the heart, is obtained providing a personalized model of the heart of the particular patient. This detailed, accurate and personalized 3D model 32 is then used for dynamically tracking and segmenting the heart in a fast 2D image acquisition as sequence of images 34.

The sequence of images 34 of the object 15 is provided as a dynamic sequence 34 of ultrasound images. The upper heart chambers 40, 42 and the lower heart chambers 44, 46 are represented by the sequence 34 of images. Some images of the sequence might contain, in some embodiments, only a sub-region of the object 15, e.g. only the upper heart chamber 40. This ensures that a high framerate of higher than 10 Hz. The ultrasound images are 2D images, and can be provided as cross-plane images in other embodiments.

Figure 2B:
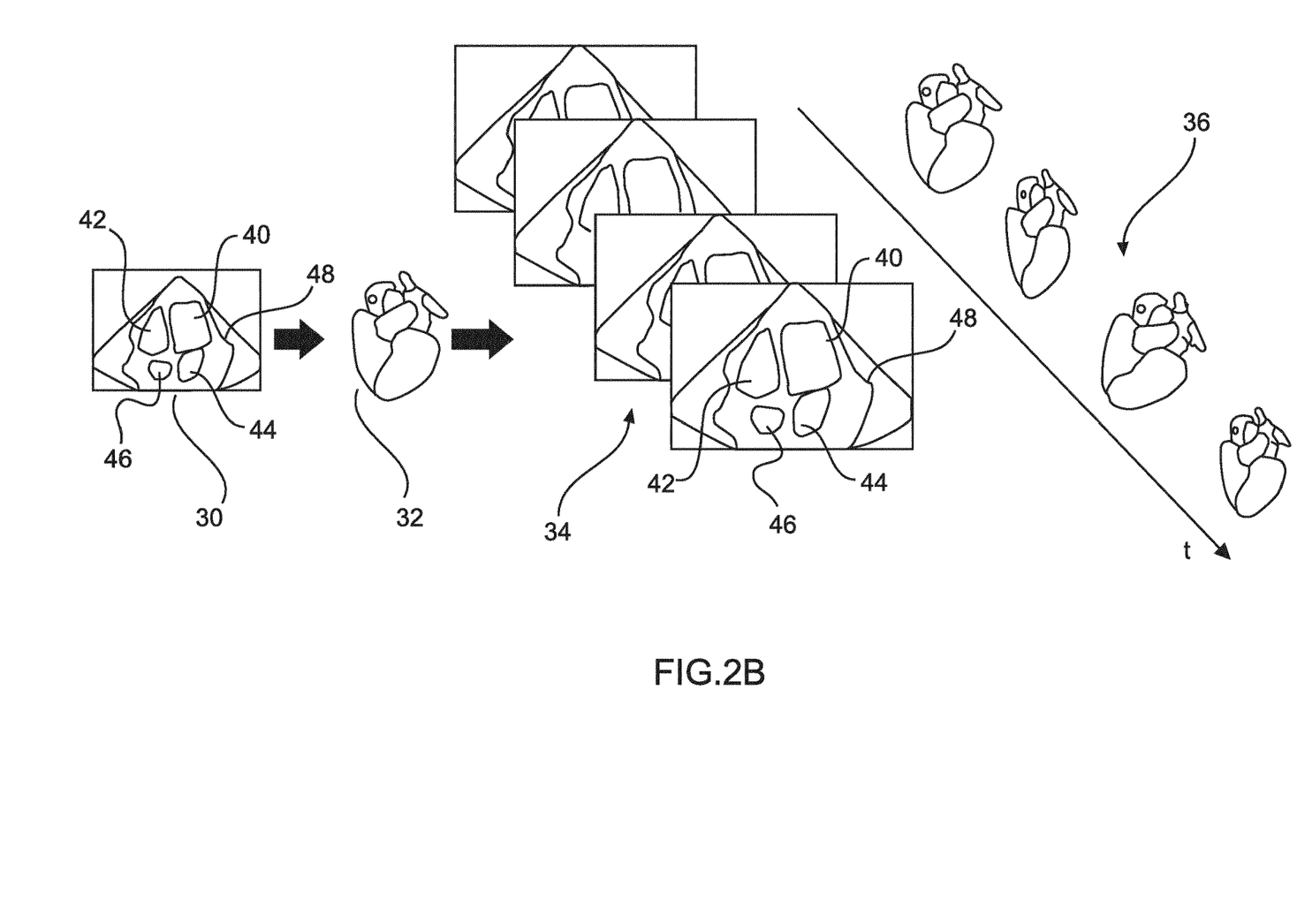
FIG. 2B: the schematic illustration of FIG. 2A.
Figure 2C:
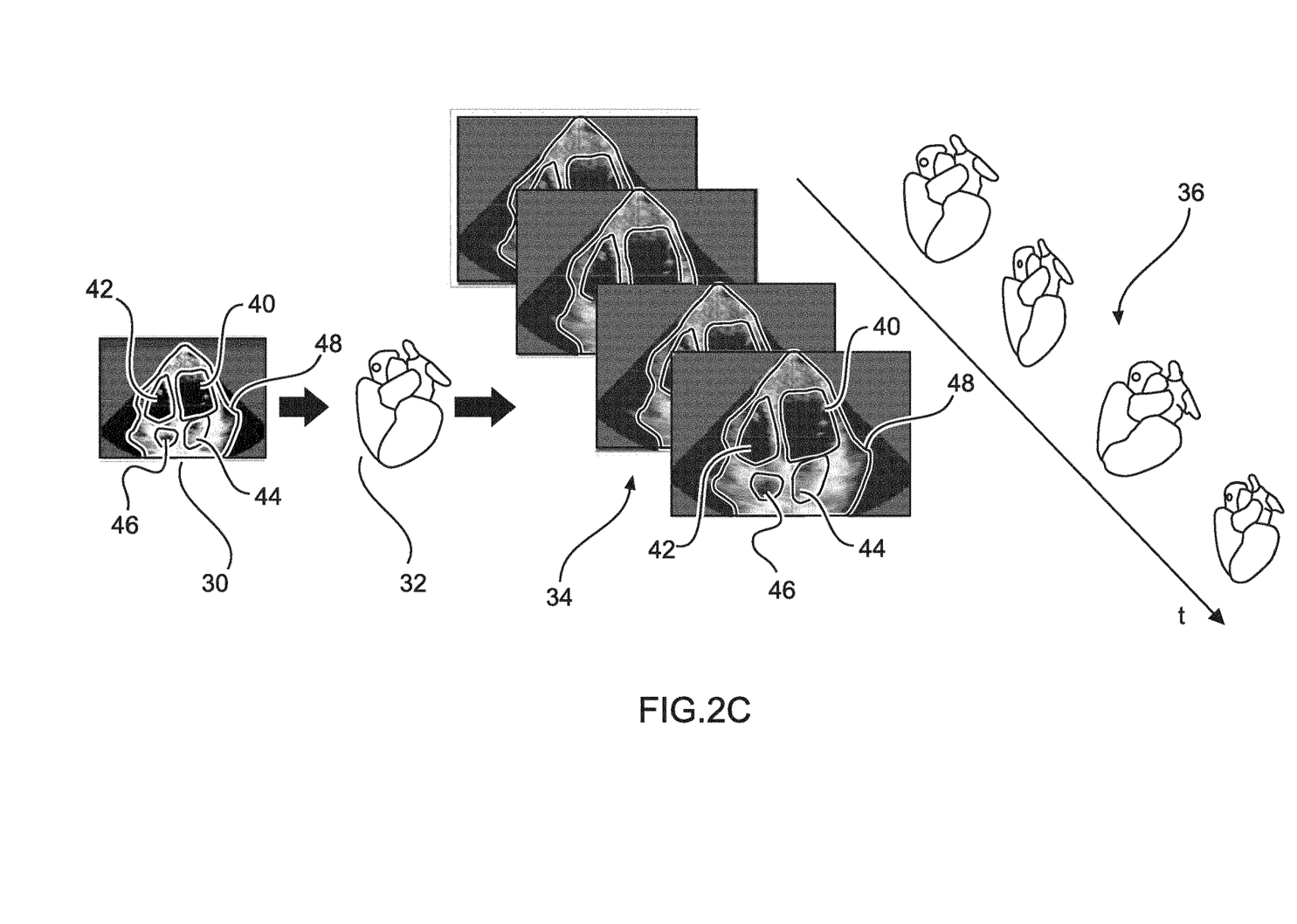
FIG. 2C: a combination of the illustration of FIGS. 2A and 2B.

By overlaying the adapted 3D model 32 and the images 34 of the object 15 the shape of the object, in this embodiment the heart, and its dynamic changes 36 over time t are made visible. In FIG. 2 the contraction and expansion of the heart chambers is clearly visible. As FIG. 2 can only provide an illustration on paper the changing dynamics are provided as a series of subsequent images.

In those regions of the object 15 which are provided by the sequence of images 34, the personalized 3D model is adapted to the provided image. In the regions of the object not shown in the images 34, the shape of the object 15 is estimated by combining the information data from those regions with the dynamic information of those parts provided from the images 34 of the sequence.

During adaptation of the personalized 3D model 32 spatial information is provided by the personalized 3D model of the object. In other words, missing spatial information of the sequence of images 34 is provided by the personalized 3D model 32 of the object. This can be achieved by replacing the generic mean shape or mesh usually used in model-based segmentation by the 3D model 32 of the object 15, which provides a personalized shape of the object 15.

FIG. 2B shows the schematic illustration of FIG. 2A wherein the ultrasound images are replaced by line drawings for improved visibility.

FIG. 2C shows a combination of the illustration of FIGS. 2A and 2B for improved understanding of the provided method and system for deriving dynamic multi-dimensional images of the object, in this case the heart.

Figure 3:
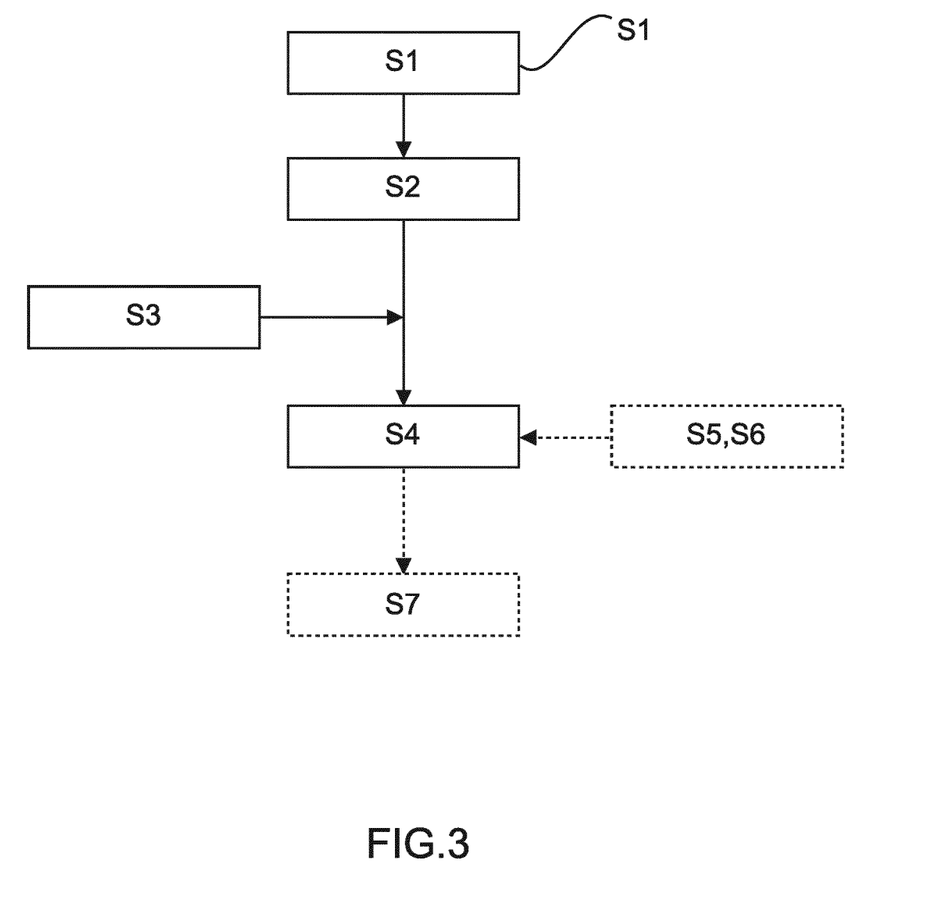
FIG. 3: a flow chart according to the method of the invention.

FIG. 3 shows a flow chart according to the method of the invention. 3D image data of an object is provided in step S1. A personalized 3D model 32 of the object is obtained by applying a model-based segmentation to the 3D image data in step S2. A sequence of images 34 of the object is provided at step S3 and the personalized 3D model is adapted based on at least a part of the images of the sequence in step S4. Thus, dynamic multi-dimensional images 36 are obtained to track the object 15 over time.

In some embodiments, spatial information (S5) is provided by the personalized 3D model during adaptation of the 3D model 32. Also, landmarks (S6) are provided for registration of the individual object 15 geometry.

The personalized 3D model 32 can be a deformable model provided as a mesh of triangles and is adapted to minimize a model energy (S7). The model energy comprises an internal and external energy. The external energy is derived from target points close to the image planes of the images 34. The internal energy comprises penalization of deviations between a current state of the mesh and the mesh from the personalized 3D model. Thus, full 3D segmentation is provided as fast and reliable 4D (3D+time) individual image of an object 15, such as the heart, in order to enhance navigation during catheter-based interventions, for example.

The method, apparatus and system for deriving dynamic multi-dimensional images of an object as provided herewith can be used in multiple different scenarios. One scenario would be image guided interventions. Here, implementation in the Echo Navigator software is appropriate. For image guided interventions a CT image is often acquired before the actual procedure, e.g. for device planning Such 3D CT scan can be used and no additional recordings for image data are necessary. An additional scenario could be cardiac ultrasound with a real-time view of the segmented heart. The feasibility of a real-time, personalized segmentation, as provided by the invention, provides tremendous advantages over known solutions and applications.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention. This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section. A computer program may be stored and/or distributed on a suitable medium, such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

As discussed above, the processing unit, for instance a controller implements the control method. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated, and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An image processing apparatus for deriving multi-dimensional images of an object, the image processing apparatus comprising:
   an interface configured to:
      provide 3D image data of the object, and
      provide a sequence of images of the object; and
   a processor configured to:
      segment the object in the 3D image data into object parts by applying a model-based segmentation to the 3D image data,
      generate a personalized 3D model of the object from the object parts,
      segment the object in the images in the sequence of images into the object parts based on spatial information provided by the personalized 3D model, and
      adapt the object parts in the personalized 3D model to the object parts segmented in the sequence of images.

2. The image processing apparatus according to claim 1, further comprising:
   a display configured to display an overlay of the adapted personalized 3D model and the sequence of images of the object.

3. A system for deriving dynamic multi-dimensional images of an object, the system comprising:
   an image acquisition apparatus configured to:
      acquire the 3D image data of the object, and
      generate a plurality of images of the object; and
   the image processing apparatus according to claim 1.

4. The system according to claim 3, wherein the image acquisition apparatus is configured to: acquire the 3D image of the object and generate the sequence of images of the object.

5. The system according to claim 4, wherein the image acquisition apparatus is an ultrasound system.

6. The image processing apparatus according to claim 1, wherein the personalized 3D model is a deformable model.

7. A method for deriving dynamic multi-dimensional images of an object, the method comprising:
   providing 3D image data of the object;
   segmenting the object in the 3D image data into object parts by applying a model-based segmentation to the 3D image data;

generating a personalized 3D model of the object from the object parts;

providing a sequence of images of the object;

segmenting the object in the images in the sequence of images into the object parts based on spatial information provided by the personalized 3D model; and adapting the object parts in the personalized 3D model to the object parts segmented in the sequence of images.

8. The method according to claim 7, wherein, during adapting the personalized 3D model, spatial information is provided by the personalized 3D model of the object.

9. The method according to claim 7, wherein the personalized 3D model is adapted to one or more images of the sequence of images by at least one of replicating and stacking the one or more images.

10. The method according to claim 7, wherein, for adapting the personalized 3D model to one or more images of the sequence of images of the object, landmarks are provided for registration of an individual object geometry with the personalized 3D model of the object.

11. The method according to claim 7, wherein the personalized 3D model is provided as a mesh of triangles and is adapted to minimize a model energy comprising an internal energy and an external energy.

12. The method according to claim 11, wherein the external energy is derived from target points close to the image planes corresponding to of one or more images of the sequence of images of the object.

13. The method according to claim 11, wherein the internal energy comprises penalization of deviations between a current state of the mesh and the mesh from the personalized 3D model.

14. The method according to claim 7, wherein the sequence of images of the object is generated at a rate of more than 10 Hz.

15. The method according to claim 7, wherein the personalized 3D model is a deformable model.

16. A non-transitory computer-readable storage medium having stored a computer program comprising instructions for controlling an image processing apparatus for deriving multi-dimensional images of an object, the instructions, which, when executed by a processor, cause the processor to:

receive 3D image data of the object;

receive a sequence of images of the object;

segment the object in the 3D image data into object parts by applying a model-based segmentation to the 3D image data;

generate a personalized 3D model of the object from the object parts;

segment the object in the images in the sequence of images into the object parts based on spatial information provided by the personalized 3D model; and adapt the object parts in the personalized 3D model to the object parts segmented in the sequence of images.

17. The non-transitory computer-readable storage medium according to claim 16, wherein the personalized 3D model is a deformable model.

18. The non-transitory computer-readable storage medium according to claim 16, wherein the personalized 3D model is adapted to one or more images of the sequence of images by at least one of replicating the one or more images and stacking the one or more images.

19. The non-transitory computer-readable storage medium according to claim 16, wherein the personalized 3D model is provided as a mesh of triangles and is adapted to minimize a model energy comprising an internal energy and an external energy.

20. The non-transitory computer-readable storage medium according to claim 19, wherein the external energy is derived from target points close to image planes corresponding to one or more images of the sequence of images of the object.

* * * * *